United States Patent [19]

Jagers et al.

[11] 4,074,121

[45] Feb. 14, 1978

[54] PHOTOFLASH LAMP UNIT

[75] Inventors: Henricus P. Jagers; Rudolf Sanders, both of Eindhoven, Netherlands

[73] Assignee: U.S. Philips Corporation, New York, N.Y.

[21] Appl. No.: 701,636

[22] Filed: July 1, 1976

[30] Foreign Application Priority Data

July 2, 1975 Netherlands ........................ 7507855

[51] Int. Cl.² ............................................. G03B 15/02
[52] U.S. Cl. ..................................................... 362/13
[58] Field of Search ...................... 354/143, 144, 126; 240/2 C, 103 C, 1.3; 24/255 BS, 245 R; 206/418, 443; 431/92, 93, 95

[56] References Cited

U.S. PATENT DOCUMENTS

| 2,462,562 | 2/1949 | Schwab | 240/103 C X |
|---|---|---|---|
| 2,769,081 | 10/1956 | Sinutko | 240/103 C X |
| 3,111,274 | 11/1963 | Turano | 240/1.3 |
| 3,180,240 | 4/1965 | Böhme et al. | 354/126 |
| 3,315,071 | 4/1967 | Pfefferle | 431/93 X |
| 3,725,693 | 4/1973 | Anderson et al. | 240/1.3 |
| 3,951,582 | 4/1976 | Holub et al. | 240/1.3 X |

FOREIGN PATENT DOCUMENTS 479,741  4/1953  Italy ........................................ 24/255

Primary Examiner—Donald D. Griffin
Attorney, Agent, or Firm—Frank R. Trifari; Robert S. Smith

[57] ABSTRACT

A flashlamp unit comprising a supporting member on which at least one lamp is secured with a reflector disposed between the supporting member and the lamp. The part of the reflector nearest the lamp comprises at least one lug which upon elastic bending out of the reflector surface constitutes a passage for the lamp. During assembly of the unit the reflector may be snapped over the lamp.

5 Claims, 7 Drawing Figures

PHOTOFLASH LAMP UNIT

The invention relates to a lamp unit, in particular a flashlamp unit, comprising a supporting member on which at least one lamp is secured, a reflector being present between the supporting member and the lamp. Such a lamp unit is known from Netherlands Patent Application No. 6,611,289.

In assembling this type of lamp unit, in principle two methods are feasible for locating the reflector between the lamp and the supporting member.

According to the first method, first the reflector is positioned on the supporting member and the lamp is then secured to the supporting member. The reflector should have an aperture for passing through the current conductors of the lamp. Since the connection place of the current conductor to the supporting member should be accessible for the assembly tool, the aperture should be rather large and be positioned at the side of the lamp. A drawback of the lamp unit thus assembled is that the area occupied by a lamp with reflector including its current conductor is rather large, which, notably in the case of several juxtaposed lamps, results in a bulky lamp unit.

According to the second method, first the lamp is secured to the supporting member, after which the reflector is slid over the lamp until it is present between the lamp and the supporting member. For that purpose the reflector comprises an aperture the size of which corresponds at least to the largest diameter of the lamp taken parallel to the supporting member. A drawback of a lamp unit manufactured in this manner is that the reflective surface area of the reflector is considerably reduced by the aperture. When elongate lamps are used, the loss of reflective surface area can be somewhat restricted by orienting the lamp with its longitudinal axis at right angles to the plane of the supporting member and, only after providing the reflector, moving it into the most suitable position, for example parallel to the supporting member, by bending the current conductor. A drawback of this is that the reflector which is not yet fixed in the lamp unit, impedes the positioning of the lamp. Furthermore, it is difficult to see whether a current conductor has become detached due to the bending operation.

It is the object of the invention to provide a lamp unit of the kind mentioned in the preamble of which the reflector has a large reflective surface area and can be assembled in the unit in a rapid and simple manner.

For that purpose, the lamp unit according to the invention is characterized in that in the part of the reflector surface present near the lamp at least one lug is formed which can be bent elastically out of said surface and in the bent position releases an aperture in the reflector surface.

The advantage of the lamp unit according to the invention is that, in the operating condition of the lamp unit, the lug present in the reflector surface forms part of the reflecting surface of the reflector and hence closes the aperture which can be formed in the reflector. As a result of this measure, the light emitted by the lamp is used optimally for reflection purpose.

A further advantage is that, irrespective of the type of lamps used, the lamps can be positioned in their final position relative to the supporting member before assembling the reflectors in the lamp unit.

The assembling of the reflector according to the invention is carried out as follows. The reflector is placed on the lamp with its side remote from the reflecting active surface in such manner that the part of the reflector comprising a lug bears against the lamp. The reflector is then forced over the lamp, the lug sliding elastically along the wall of the lamp. The lug bends out of the reflector surface in a direction corresponding to the direction in which the reflector is moved.

As a result of this bending movement, the lug releases a passage in the reflector surface for the lamp. After having passed the most bulky part of the flash-lamp, the lug again moves elastically to the closed position.

The reflector comprising a lug is suitable for cooperation with a spherical or elongate lamp, the elongate lamp being positioned with its longitudinal axis at right angles to or parallel to the supporting member. The aperture maximally achievable with elastic bending of the lug is proportioned so as to be at least to the largest equal to the largest cross section of the lamp taken in a plane transverse to the longitudinal axis of the lamp.

The reflector may be formed from flexible or still material. When the reflector consists of a flexible material, as is the case for example, in deep drawn foils of metal, the lug as such can be bent relative to the remainder of the reflector. When the reflector is stiff and unbendable, which is usually the case with moulded reflectors, the lug is connected to the reflector with a moulded elastic transition.

A favourable embodiment of the lamp unit according to the invention is characterized in that a continuous recess of which at least one of the boundaries is formed by the lug is provided in the relevant reflector part. The advantage of this embodiment is that the recess may have such a shape that, during assembly of the reflector, the lug slides flexibly along the wall of the lamp envelope. Therefore a special tool with which the lug, at least during the beginning of the assembly, is bent to such an extent that a first part of the lamp can be inserted, is not necessary.

Another favourable embodiment of the lamp unit according to the invention is characterized in that in the relevant part of the reflector surface opposite to the said lug a second lug is present, a common passage for the lamp being obtained by elastic bending of both lugs out of the reflector surface. The aperture in the reflector wall required in assembling the lamp unit for passing through the lamp is obtained in this embodiment by two lugs which can be bent out of the reflector surface. The advantage of this embodiment is that during assembly the reflector slides uniformly over the lamp. During this movement, the two lugs slide along diametrically situated sides of the lamp with some friction.

A further favourable embodiment of the lamp unit according to the invention is characterized in that the two lugs bound a slot-like aperture extending parallel to the lamp axis, said slot-like aperture comprising a widening on at least one of its narrow ends. The reflector according to this embodiment is particularly suitable for cooperation with an elongate lamp oriented parallel to the part of the reflector comprising the lugs. In this embodiment it is possible for the reflector to be snapped over the oriented lamp which is already present in the lamp unit. Another advantage of this embodiment is that the lamp unit, viewed in the longitudinal direction of the lamp, has a short structural length. This is the result of the favourable arrangement of the lamp in the reflector in which the lamp bears with its ends in the widenings on the narrow ends of the slot-like aperture.

The invention will be described in greater detail with reference to the drawing which shows an embodiment of the lamp unit according to the invention.

Figure 1:
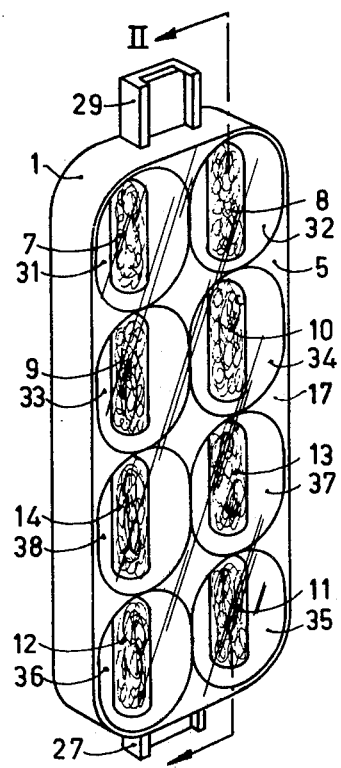
FIG. 1 is a perspective front elevation of the lamp unit according to the invention comprising flashlamps.
Figure 2:
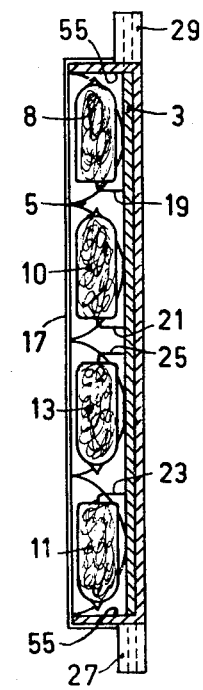
FIG. 2 is a cross-sectional view taken on the line II—II of the flashlamp unit shown in FIG. 1.

As shown in FIGS. 1 and 2, an embodiment of the lamp unit according to the invention comprises a flat-box-like housing 1 of a synthetic material in which are present a supporting member 3, a foil 5 comprising reflectors, eight piezo-electrically ignitable elongate flashlamps 7 to 14 arranged parallel to the supporting member, and a electric switching circuit not shown. Instead of piezo-electrically ignitable flashlamps, the lamp unit according to the invention may alternatively comprise low-voltage flashlamps or percussion flashlamps. When using percussion flashlamps, the electric switching circuit is replaced by a mechanical construction including percussion springs. The box-like housing is closed by means of a transparent cover 17. The flashlamps are each connected mechanically with their current conductors to the supporting member 3 and are connected electrically to the switching circuit. In FIG. 2 the current conductors of the flashlamps 8, 10, 11 and 13 are denoted by 19, 21, 23 and 25.

It is known per se from Netherlands Patent Application 7,504,397 to provide the flashlamp unit with two coupling members 27 and 29 which are each suitable to connect the flashlamp unit to a camera, in which each of the flashlamps 7 to 10 can be flashed by a pulse entering the unit via the coupling member 27 and the flashlamps 11 to 14 can be fired by a pulse entering the unit via the coupling member 29.

In this embodiment the reflectors in the flashlamp unit according to the invention form part of a common foil 5 which is formed polyvinyl propionate. Of course, aluminum-containing material is vapour-deposited on the foil so as to obtain a reflective surface. The reflectors each have a concave surface.

In the Figures the reflectors are referenced 31 to 38 and their number corresponds to the number of flashlamps.

Figure 3:
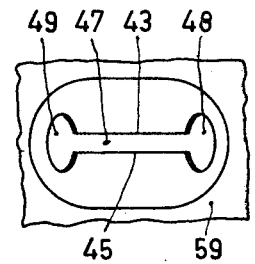
FIG. 3 is a plan view of a reflector.

FIG. 3 shows how a reflector according to the invention may be constructed. Each reflector comprises a portion which has two lugs 43 and 45 which can be elastically bent of the reflector surface. The lugs 43 and 45 constitute to create an enlarged passage. The resilient action of the reflector material ensures that the lugs move back from their bent position to their closed position. In the closed position the lugs form part of the active surface of the reflector. In their closed position the lugs 43 and 45 bound a slot-like aperture 47 having at its ends widenings 48 and 49.

The reflector comprising lugs is used favourable in assembling the flashlamp unit according to the invention.

Figure 4:
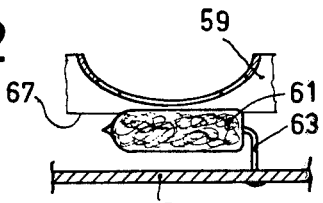
FIG. 4 shows the position of the reflector prior to assembly relative to the already mounted lamp.
Figure 5:
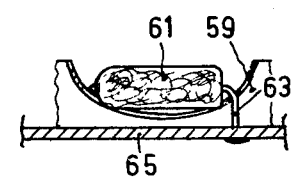
FIG. 5 shows the reflector in the assembled condition.

The way of assembling a reflector 59 will be described in detail with reference to FIGS. 4 and 5. Before assembling the reflector, the flashlamp 61 is secured to the supporting member 65 with its current conductors 63 (one not shown).

The reflector 59 is arranged between the positioned flashlamp 61 and the supporting member 65. For that purpose, the reflector 59 is arranged on the flashlamp 61 with its side 67 remote from the active reflective surface is such manner that the two lugs 43 and 45 bear on the flashlamp, while the slot-like aperture 47 extends parallel to the longitudinal axis of the flashlamp 61. The reflector 59 is then forced over the flashlamp 61, the lugs 43 and 45 sliding along the wall of the flashlamp 61. The lugs 43 and 45 bend in a direction towards the supporting member 65 while forming a widening aperture which forms a passage for the flashlamp 61. Due to the elastic action of the reflector material, the lugs 43 and 45 remain in contact with the wall of the flashlamp 61 also after having passed the bulkiest part of the flashlamp 61. After the passage of the flashlamp 61 the lugs 43 and 45 are again in their closed position. Dependent upon the chosen dimensions of the reflector, it is of course also possible that the lugs, after passing the flashlamp, do not return entirely to their closed position but assume a position in which they bear against the flashlamp.

Figure 6:
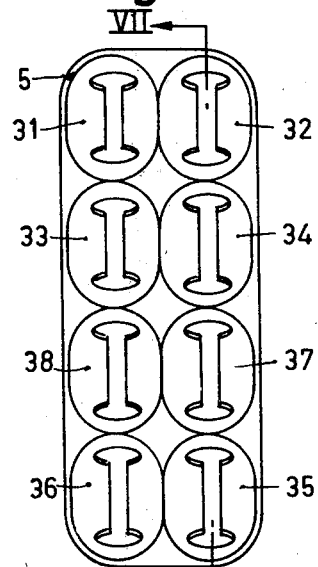
FIG. 6 is a front elevation of the foil of FIG. 1 comprising reflectors.
Figure 7:
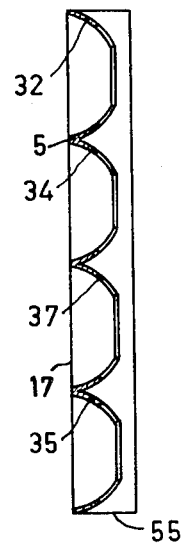
FIG. 7 is a sectional view taken on the line VII—VII of the foil shown in FIG. 6.

FIGS. 6 and 7 show the common foil 8 of the flashlamp unit according to this embodiment. Said foil 8 comprises eight reflectors 31 to 38 each having a shape as is shown in FIG. 3. This foil 5 has the advantage that the eight reflectors can be assembled collectively in one operation. After the passage, the side of the foil 5 remote from the reflectors bears against the supporting member 3 with the edge portions 55, while the foil with its side comprising the reflectors is closed by the transparent cover 17 of the flashlamp unit.

What is claimed is:

1. A flashlamp unit comprising: a generally planar supporting member; a plurality of photoflash lamps secured to said supporting member, each lamp being elongated and having a longitudinal axis, each said longitudinal axis being disposed parallel to said generally planar supporting member; and a reflector disposed between said supporting member and said plurality of lamps, said reflector surface proximate to each lamp being (a) generally concave on a side facing said plurality of lamps (b) having an elongated aperture therein, and (c) having at least one elastically deformable lug abutting said elongated aperture, said lug being bendable elastically away from the contiguous surface, said lug in the bent position enlarging said elongated aperture.

2. A lamp unit as claimed in claim 1 wherein the maximum size aperture with deformation of said lug is at least equal to the largest cross-section of the lamp taken in a plane transverse to the longitudinal axis of the lamp.

3. A lamp unit as claimed in claim 1 wherein each aperture has boundaries in addition to the boundary formed by said lug.

4. A lamp unit as claimed in claim 3 wherein boundary of said each aperture includes a second elastically deformable lug, said first and second lugs having substantially straight ends (as viewed in a plane parallel to said lamp longitudinal axes), said straight ends being substantially parallel and spaced from each other when assembled in said flashlamp unit.

5. A lamp unit as claimed in claim 4 wherein each boundary of each of said apertures further includes a widening at least at one extremity of said substantially straight ends.

* * * * *